(12) United States Patent
Gaertner

(10) Patent No.: US 9,537,243 B2
(45) Date of Patent: Jan. 3, 2017

(54) ELECTRICAL CONTACT ELEMENT AND METHOD FOR MANUFACTURING SAME

(71) Applicant: DELPHI TECHNOLOGIES, INC., Troy, MI (US)

(72) Inventor: Markus Gaertner, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/783,928

(22) PCT Filed: Apr. 29, 2014

(86) PCT No.: PCT/EP2014/058727
§ 371 (c)(1),
(2) Date: Oct. 12, 2015

(87) PCT Pub. No.: WO2014/177563
PCT Pub. Date: Nov. 6, 2014

(65) Prior Publication Data
US 2016/0064847 A1   Mar. 3, 2016

(30) Foreign Application Priority Data

May 3, 2013 (EP) .................................. 13166454

(51) Int. Cl.
*H01R 13/02* (2006.01)
*H01R 13/415* (2006.01)
(Continued)

(52) U.S. Cl.
CPC .......... *H01R 13/415* (2013.01); *B32B 15/013* (2013.01); *C23C 2/06* (2013.01); *C23C 2/26* (2013.01);
(Continued)

(58) Field of Classification Search
CPC ......... H01R 13/415; H01R 4/18; H01R 43/16; H01R 4/185; H01R 13/03; C23C 28/3225; C23C 28/321; C25D 5/10; C25D 5/12
(Continued)

(56) References Cited

U.S. PATENT DOCUMENTS 6,613,451 B1    9/2003   Asahara et al.
8,827,754 B2 *  9/2014   Lee ...................... H01R 13/113
                                                              439/843
(Continued)

FOREIGN PATENT DOCUMENTS

EP        1788585 A1      5/2007
WO     2005074026 A2      8/2005

OTHER PUBLICATIONS

International Search Report for International Patent Application PCT/EP2014/058727, published Jul. 21, 2014.

*Primary Examiner* — Khiem Nguyen
(74) *Attorney, Agent, or Firm* — Robert J. Myers

(57) ABSTRACT

An electrical contact element and a method of manufacturing an electrical contact element having a connecting segment which is formed of a copper sheet and comprising a coating overlaying the copper sheet having at least two layers. A first layer contains at least 60% by weight of tin. A second layer is disposed between the first layer and the copper sheet. The second layer contains a copper-containing alloy. The copper-containing alloy contains 40 to 80% by weight of copper and 20 to 60% by weight of zinc. The combined percentage by weight of copper and zinc in the second layer is at least 90%. A third layer containing tin may be disposed between the second layer and the copper sheet. A fourth layer containing zinc may be disposed on a side of the first layer opposite the second layer.

13 Claims, 3 Drawing Sheets

(51) Int. Cl.

| | |
|---|---|
| *C25D 5/12* | (2006.01) |
| *C25D 7/00* | (2006.01) |
| *H01R 13/03* | (2006.01) |
| *H01R 4/18* | (2006.01) |
| *H01R 43/16* | (2006.01) |
| *C23C 2/06* | (2006.01) |
| *C23C 2/26* | (2006.01) |
| *C23C 28/00* | (2006.01) |
| *B32B 15/01* | (2006.01) |
| *C25D 5/10* | (2006.01) |
| *C25D 5/50* | (2006.01) |
| *C25D 3/12* | (2006.01) |
| *C25D 3/58* | (2006.01) |
| *C25D 3/22* | (2006.01) |
| *C25D 3/30* | (2006.01) |

(52) U.S. Cl.
CPC ......... *C23C 28/321* (2013.01); *C23C 28/3225* (2013.01); *C25D 5/10* (2013.01); *C25D 5/12* (2013.01); *C25D 5/505* (2013.01); *C25D 7/00* (2013.01); *H01R 4/18* (2013.01); *H01R 4/185* (2013.01); *H01R 13/03* (2013.01); *H01R 43/16* (2013.01); *C25D 3/12* (2013.01); *C25D 3/22* (2013.01); *C25D 3/30* (2013.01); *C25D 3/58* (2013.01)

(58) Field of Classification Search
USPC .................................. 439/741, 877, 884, 887
See application file for complete search history.

(56) References Cited

U.S. PATENT DOCUMENTS

| | | | |
|---|---|---|---|
| 9,039,429 B2* | 5/2015 | Shimoji | ............... H01R 12/728 439/81 |
| 9,178,304 B2* | 11/2015 | Pablo Curto | .......... G01K 7/023 |
| 2008/0090096 A1 | 4/2008 | Suzuki et al. | |
| 2008/0257581 A1 | 10/2008 | Masago et al. | |
| 2008/0261071 A1 | 10/2008 | Xu et al. | |
| 2010/0304016 A1 | 12/2010 | Suzuki et al. | |

* cited by examiner

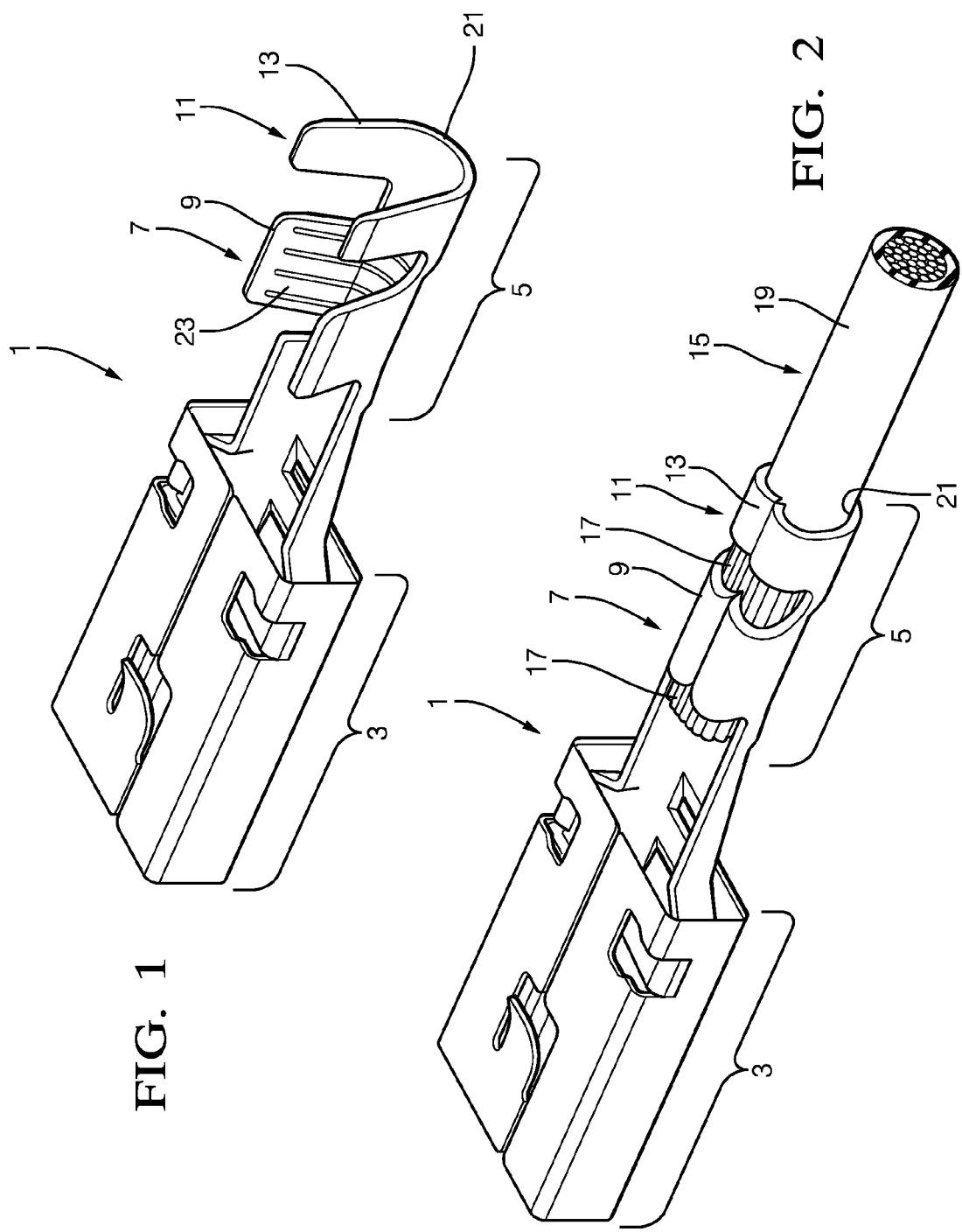

ELECTRICAL CONTACT ELEMENT AND METHOD FOR MANUFACTURING SAME

CROSS-REFERENCE TO RELATED APPLICATION

This application is a national stage application under 35 U.S.C. §371 of PCT Application Number PCT/EP2014/0058727 having an international filing date of Apr. 29, 2014 which designated the United States, which claimed priority to European Application Number 13166454.2 filed in the European Patent office on May 3, 2013, the entire disclosure of each of which are hereby incorporated herein by reference.

TECHNICAL FIELD OF THE INVENTION

The present invention relates to an electrical contact element having a coating comprising at least two layers and containing tin, and a method for manufacturing such a contact element.

BACKGROUND OF THE INVENTION

In view of the concerns of climate protection, the reduction of emissions of greenhouse gases such as carbon dioxide is of particular importance. Therefore, the automotive industry is striving to develop vehicles that have a relatively low fuel consumption to reduce carbon dioxide emissions in this way and to contribute to climate protection.

One approach for reducing fuel consumption and thus carbon dioxide emission is based on the reduction of the weight of the vehicle. In order to achieve weight savings, there is an intensified search for possibilities to replace materials with relatively high weight with lighter materials, so that the vehicle components can be made of lightweight materials.

According to this concept, there are efforts to also reduce the weight of the wiring of a vehicle by replacing copper which is typically used as a conductor material in cables by lightweight alternatives. A possible conductor material is aluminum, which is in principle suitable for replacing the copper lines, which as a light metal has a low density and thus a low weight.

However, the disadvantage is that when using aluminum as conductor material in combination with electrical contact elements, which are typically made of copper, corrosion processes occur at the contact point between copper and aluminum in the presence of an electrolyte, such as salt water, and atmospheric oxygen. These corrosion processes are particularly existent in the case of direct contact of copper and aluminum, since according to the electrochemical series there is a considerable difference between the standard potentials (normal potentials) of aluminum and copper, and thus a high driving force for the corrosion reaction. Through the galvanic corrosion, the amount of aluminum as less noble metal is reduced compared to copper, which significantly reduces the electrical conductivity at the contact points between the conductor material and the contact element, and thus a demand exists for a reliable corrosion protection in the use of aluminum conductor material in combination with an electrical contact element made of copper.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

The invention is based on the object to provide an electrical contact element, which can be used in combination with an aluminum-containing conductor material and offers reliable protection against corrosion.

The contact element according to the invention comprises a connecting segment, which is formed of a copper sheet and has a coating comprising a first layer containing tin. Furthermore, the coating comprises a second layer which is disposed between the first layer and the copper sheet. The second layer contains at least a metal or at least a metal alloy, wherein the metal or metal alloy is selected from the group consisting of copper-containing alloys, nickel, nickel-containing alloys, palladium, palladium-containing alloys, and any combinations of the above metals and metal alloys.

The invention is based on the general idea that the electrochemical potential of the connecting segment approaches the potential of aluminum, which is lower according to the electrochemical series, by a coating of the copper sheet connecting segment of the contact element, provided for contacting with an aluminum-containing conductor material. In this way, the difference between the potentials of copper and aluminum is at least approximately compensated, and thus the driving force of the corrosion is reduced so that it is no longer in a critical range. This corrosion protection is achieved in particular in that the coating with tin contains an element, which is between copper and aluminum in the electrochemical series.

A corrosion protection function is achieved in particular by the first layer containing tin, which is between copper and aluminum in the electrochemical series.

In contrast, the second layer provides a barrier function. Due to the arrangement of the second layer between the tin-containing first layer and the copper sheet of the connecting segment, the exchange of metal atoms by diffusion between the tin-containing first layer and the copper sheet is prevented. Without this barrier layer, the risk would arise that over the life of the vehicle a diffusion of tin from the first layer into the copper sheet occurs and hollow spaces or pores in the first layer are formed. Such a formation of hollow spaces and/or cracks would facilitate the penetration of an electrolyte into the layer system and expedite undesirable corrosion. To avoid this, the second layer is arranged between the tin-containing first layer and the copper sheet of the connecting segment, which at least contains a metal or at least a metal alloy selected from the group consisting of copper-containing alloys, nickel, nickel-containing alloys, palladium, palladium-containing alloys, and any combinations of the above metals and metal alloys.

All things considered, the contact element of the invention has excellent protection against corrosion at the contact point between the contact element and an aluminum-containing conductor material with at the same time minimal contact resistance by optimal electrical conductivity of the coating, ensuring permanent optimum contact with the conductor material.

The contact element according to the invention is generally suitable for contacting aluminum-containing lines. The contact element may be used in vehicle construction, since in this way aluminum-containing lines may be used instead of copper-containing lines, thereby a reduction of vehicle weight and thus fuel savings and reduced carbon dioxide emissions can be achieved.

Advantageous embodiments of the invention are disclosed in the dependent claims, the description and the drawings.

The connecting segment of the electrical contact element is a region which is provided for receiving the conductor material of an electrical line such as a cable. This can be done for example by crimping the connection with the conductor material.

At least the connecting segment of the electrical contact element is formed of a copper sheet. However, other portions and in particular the complete contact element may be formed of a copper sheet. For example, the contact element may be a stamped/bent part.

To be able to act as corrosion protection, in each case the coating is applied to the connecting segment of the electrical contact element. However, the coating may also be present in other areas of the contact element, wherein in principle it is conceivable that the coating completely covers the surface of the contact element. However, the coating may be limited only to the connecting segment of the contact element and that the remaining areas of the contact element, in particular an area intended for contacting a complementary contact element, for example a plug or socket portion, are without coating, to ensure an optimal electrical connection between the contact elements.

Advantageous embodiments of the invention will be described in the following.

Satisfactory results in terms of the barrier function are achieved when the second layer has a thickness of 0.1 to 5 micrometers (μm), preferably of 0.5 to 5 μm, more preferably of 0.5 to 3 μm, even more preferably of 0.7 to 2.5 μm, and most preferably of 0.8 to 2.2 μm.

Furthermore, the second layer may contain a copper-containing alloy. In particular, the second layer may consist of a copper-containing alloy.

For example, the copper-containing alloy may comprise a content of 35 to 97% by weight of copper, preferably a content of 40 to 90% by weight of copper, more preferably a content of 45 to 80% by weight of copper, and most preferably a content of 50 to 65% by weight of copper in relation to the copper-containing alloy to achieve good results in terms of the barrier function.

Furthermore, the copper-containing alloy may comprise a metal which is between copper and aluminum in the electrochemical series. In this way, the second layer also provides a contribution to approaching the potential of aluminum and to the reduction of the potential difference between the copper sheet of the contact element and the aluminum-containing conductor material to reduce the driving force for the corrosion reaction. For example, the copper-containing alloy may contain tin and/or zinc. Thus, a bronze alloy or brass alloy may be used as a copper-containing alloy, for example. Optionally, the bronze alloy may further comprise a zinc supplement, while conversely the brass alloy may optionally contain tin.

To form an effective diffusion barrier and to achieve good corrosion protection, the second layer may contain a copper-containing alloy, including tin and zinc, or consist of one.

Such a copper-, tin- and zinc-containing alloy contains 35 to 75% by weight of copper, 15 to 45% by weight of tin and 5 to 50% by weight of zinc, more preferably 40 to 70% by weight of copper, 20 to 40% by weight of tin and 10 to 30% by weight of zinc, even more preferably 45 to 65% by weight of copper, 25 to 35% by weight of tin and 10 to 30% by weight of zinc, most preferably 48 to 60% by weight of copper, 27 to 33% by weight of tin and 12 to 20% by weight of zinc, in relation to the copper-containing alloy, respectively. The sum of copper, tin and zinc, is preferably at least 90% by weight in relation to the copper-containing alloy. The residual weight of the copper-containing alloy may be alloy components typically used in copper-containing alloys, such as nickel, palladium, phosphorus, aluminum, iron, cobalt, manganese, tungsten, gold, silver and/or lead, for example, and/or inevitable impurities.

According to a further embodiment, the second layer may contain a copper-, tin- and zinc-containing alloy or consist of one, which comprises preferably 35 to 75% by weight of copper, 15 to 45% by weight of tin and 5 to 50% by weight of zinc, more preferably 40 to 70% by weight of copper, 20 to 40% by weight of tin and 10 to 30% by weight of zinc, even more preferably 45 to 65% by weight of copper, 25 to 35% by weight of tin and 10 to 30% by weight of zinc, most preferably 48 to 60% by weight of copper, 27 to 33% by weight of tin and 12 to 20% by weight of zinc in relation to the copper-containing alloy, respectively, wherein the sum of copper, tin and zinc is preferably at least 95% by weight of the copper-containing alloy. The residual weight of the copper-containing alloy may be alloy components typically used in copper-containing alloys, which may be, for example, the elements listed in the previous paragraph, and/or inevitable impurities.

According to yet a further embodiment, the second layer may contain a copper-, tin- and zinc-containing alloy or consist of one, which comprises preferably 35 to 75% by weight of copper, 15 to 45% by weight of tin and 5 to 50% by weight of zinc, more preferably 40 to 70% by weight of copper, 20 to 40% by weight of tin and 10 to 30% by weight of zinc, even more preferably 45 to 65% by weight of copper, 25 to 35% by weight of tin and 10 to 30% by weight of zinc, most preferably 48 to 60% by weight of copper, 27 to 33% by weight of tin and 12 to 20% by weight of the copper-containing alloy, respectively, wherein the sum of copper, tin and zinc is preferably at least 98% by weight of the copper-containing alloy. The residual weight of the copper-containing alloy may also be alloy components typically used in copper-containing alloys, which may be the elements listed in both previous paragraphs, and/or inevitable impurities.

An effective diffusion barrier and a good corrosion protection are also achieved when the second layer contains a copper- and zinc-containing alloy or consists of such an alloy.

Preferably, such a copper- and zinc-containing alloy contains 40 to 80% by weight of copper and 20 to 60% by weight of zinc, more preferably 50 to 75% by weight of copper and 25 to 50% by weight of zinc, even more preferably 55 to 70% by weight of copper and 30 to 45% by weight of zinc, most preferably 57 to 68% by weight of copper and 32 to 43% by weight of the copper-containing alloy, respectively. Thereby, the sum of copper and zinc is preferably at least 90% by weight of the copper-containing alloy. The residual weight of the copper-containing alloy may be alloy components typically used in copper-containing alloys, such as nickel, palladium, phosphorus, aluminum, iron, cobalt, manganese, tungsten, gold, silver, tin and/or lead, for example, and/or inevitable impurities.

According to a further embodiment, the second layer may contain a copper- and zinc-containing alloy, preferably with 40 to 80% by weight of copper and 20 to 60% by weight of zinc, more preferably 50 to 75% by weight of copper and 25 to 50% by weight of zinc, even more preferably 55 to 70% by weight of copper and 30 to 45% by weight of zinc, most preferably 57 to 68% by weight of copper and 32 to 43% by weight of zinc in relation to the copper-containing alloy, respectively, or consist of one, wherein the sum of copper and zinc is at least 95% by weight of the copper-containing alloy. The residual weight of the copper-containing alloy may be alloy components typically used in copper-containing alloys, which may be the elements listed in the previous paragraph, for example, and/or inevitable impurities.

According to yet a further embodiment, the second layer may contain a copper- and zinc-containing alloy, preferably with 40 to 80% by weight of copper and 20 to 60% by weight of zinc, more preferably 50 to 75% by weight of copper and 25 to 50% by weight of zinc, even more preferably 55 to 70% by weight of copper and 30 to 45% by weight of zinc, most preferably 57 to 68% by weight of copper and 32 to 43% by weight of zinc in relation to the copper-containing alloy, respectively, or consists of one, wherein the sum of copper and zinc is preferably at least 98% by weight in relation to the copper-containing alloy. The residual weight of the copper-containing alloy may be alloy components typically used in copper-containing alloys, in particular the elements listed in the two previous paragraphs, and/or inevitable impurities.

According to an alternative embodiment, the second layer may contain nickel or a nickel-containing alloy and particularly consist preferably of nickel or a nickel-containing alloy. When the second layer contains nickel or a nickel-containing alloy or consists of a nickel-containing alloy, the nickel content is preferably at least 80% by weight, more preferably at least 90% by weight, even more preferably at least 95% by weight and most preferably at least 98% by weight of the nickel-containing alloy. The residual weight of the nickel-containing alloy may be alloy components typically used in nickel-containing alloys such as copper, palladium, platinum, aluminum, cobalt, manganese, silicon, chromium, iron, zinc, molybdenum, tungsten, magnesium and/or titanium, for example.

Further alternatively, the second layer may contain palladium or a palladium-containing alloy or in particular consist of one, wherein the palladium content is preferably at least 80% by weight of palladium, more preferably at least 90% by weight of palladium, even more preferably at least 95% by weight of palladium and most preferably at least 98% by weight of the palladium-containing alloy. The residual weight of the palladium-containing alloy may be alloy components typically used in palladium-containing alloys such as, for example, copper, nickel, platinum, silver and/or gold, and/or inevitable impurities.

According to a further embodiment, the first layer of the coating is an outer layer, which is intended for direct contact with the conductor material. Furthermore, the first layer is preferably directly adjacent to the second layer, i.e., the first layer is preferably immediately above the second layer.

According to yet another embodiment, a good protection against corrosion is achieved particularly when the first layer contains at least 60% by weight of the first layer. Preferably, the first layer contains at least 70% by weight of tin, more preferably at least 80% by weight of tin and most preferably at least 90% by weight of tin in relation to the first layer. In particular, the first layer may be a high purity tin layer, for example containing at least 95% by weight of tin or at least 98% by weight of tin.

In addition, the first layer may contain zinc to further approach the potential of the first layer to the potential of the aluminum-containing conductor material by the addition of zinc, which has a lower standard potential than tin but a higher standard potential as aluminum according to the electrochemical series, and thus reduce the potential difference as a driving force for corrosion. For example, the first layer may contain 0 to 40% by weight of zinc, preferably 2 to 30% by weight of zinc, more preferably 5 to 25% by weight of zinc, and most preferably 10 to 20% by weight of zinc in relation to the first layer. When the first layer contains both tin and zinc, the sum of tin and zinc is preferably 90% by weight, more preferably 95% by weight, most preferably 98% by weight in relation to the second layer. The residual weight of the second layer may be typical components which are used in tin and/or zinc alloys, and/or inevitable impurities.

To also achieve effective corrosion protection for a life span normally expected in automotive applications, for example, the first layer preferably has a thickness of 1 to 15 µm, more preferably of 2 to 10 µm, even more preferably of 3 to 7 µm, most preferably of 4 to 6 µm, and in particular, if the second layer has a thickness of 0.1 to 5 µm, preferably of 0.5 to 5 µm, more preferably of 0.5 to 3 µm, even more preferably of 0.7 to 2.5 µm, most preferably of 0.8 to 2.2 µm.

According to yet another embodiment, the coating may further comprise a third layer which is disposed between the second layer and the copper sheet and contains tin. Such a third layer is present, for example, when for manufacturing the electrical contact element, a copper sheet is used as starting material, which is provided with a tin layer applied by fire-tinning. If there is a third layer, for example in the case of a fire-tinned copper sheet, it is regarded as part of the coating and not as part of the copper sheet.

In the case of the presence of a third layer, it contains preferably at least 80% by weight of tin, more preferably at least 90% by weight of tin, even more preferably at least 95% by weight of tin and most preferably at least 98% by weight of tin in relation to the third layer. Most preferably, the third layer consists of tin.

The thickness of the third layer may be in the range of 0.01 to 5 µm, preferably 0.5 to 3.5 µm, and more preferably 1 to 2 µm.

According to a further preferred embodiment, the third layer is directly adjacent to the second layer and/or to the copper sheet of the contact element. If no third layer is provided, the second layer may be applied directly to the copper sheet of the contact element and be adjacent to it.

Further, the coating may comprise a fourth layer, which is arranged on a side of the first layer opposite the second layer and the copper sheet and contains zinc. Such a fourth layer may be formed as an outer layer. In addition, the fourth layer may be directly adjacent to the first layer. Such a structure of the coating, in which not only an original first layer and a second layer but also a fourth layer is provided, which is formed as an outer layer and is directly adjacent to the first layer, may in itself already serve as corrosion protection. Preferably, however, such a layer structure is used as intermediate product for the preparation of a coating, in which by at least partial merging of the original first layer and the fourth layer, for example by heat treatment, a modified first layer is formed containing both tin and zinc. In particular, a tin- and zinc-containing alloy may form in such a merging.

If a fourth layer is provided additionally to the first and second layers, it contains preferably at least 80% by weight of zinc, more preferably at least 90% by weight of zinc, even more preferably at least 95% by weight of zinc, and most preferably at least 98% by weight of zinc in relation to the fourth layer. Alternatively, the fourth layer may also consist of zinc.

The thickness of the fourth layer may range from 0.1 to 3 µm, preferably from 0.2 to 2 µm, more preferably from 0.5 to 1.5 µm and most preferably from 0.7 to 1.3 µm. By selecting the thicknesses and the contents of tin and zinc of the original first layer applied before the heat treatment and of the fourth layer, the tin content and the zinc content may be adjusted in the modified first layer, which is formed by at least partial merging of the original first layer and the fourth layer by means of heat treatment.

The layers of the coating described above may be directly adjacent to one another according to one embodiment. However, it is also possible that there are regions between the respective layers comprising one or more intermetallic phases. Such intermetallic phase regions may contain metals from the respective layers adjacent to these regions and may be caused for example by diffusion processes during storage of the coating for a longer period of time or formed specifically by heat treatment. For example, intermetallic phase region may be provided between the first layer and the second layer and/or between the second layer and the third layer and/or between the third layer and the copper sheet and/or between the first layer and the fourth layer. Without wanting to be bound by theory, it is assumed that such intermetallic phase regions reinforce the barrier function to prevent in this way diffusion processes between the layers and thus to increase the life period of the coating. The thickness of said intermetallic phase regions may be from 0.01 to 3 µm, preferably from 0.1 to 2 µm, more preferably from 0.25 to 1.5 µm, and most preferably from 0.5 to 1 µm, respectively.

The total thickness of the coating may be from 1 to 25 µm, preferably 2 to 20 µm, more preferably 3 to 15 µm and most preferably 4 to 10 µm, in particular independently of the above described thicknesses of the individual layers. Thereby, the thickness of a possibly existing intermetallic phase region, which is directly adjacent to the copper sheet, counts to the total thickness of the coating.

A further object of present invention is a method for manufacturing an electrical contact element, in particular for manufacturing an electrical contact element according to one of the types described above, comprising the steps of:
  providing a base body of optionally fire-tinned copper sheet,
  applying a second layer on the base body, wherein the second layer contains at least a metal or at least a metal alloy, wherein the metal or metal alloy is selected from the group consisting of a copper-containing alloy, nickel, palladium and any combinations of the above metals and metal alloys, and
  applying a first layer containing tin on a side of the second layer opposite the base body.

The shape of the base body on which the layers are applied is not particularly limited. For example, the base body can already have the final shape of the contact element. Alternatively, the base body can be brought into the final shape of the contact element only after its coating by forming steps such as stamping and/or bending, for example.

In order not to interfere with the electrical conductivity when contacting the electrical contact element, as described above, the coating is preferably applied only to an area of the base body provided as connecting segment. However, it is also conceivable to apply the coating to other areas of the base body, in particular to the complete base body.

Advantageous embodiments of the method for manufacturing a contact element are described below.

In addition to the first and second layers, optionally a third and/or fourth layer, as described above, may be applied.

Preferably, the first, the second, optionally the third and/or fourth layers are applied such that the above arrangement of the layers relative to each other results. Thereby, the layers of the coating preferably are directly adjacent to one another, and the third layer preferably is directly adjacent to the copper sheet of the connecting segment.

The first layer and the second layer preferably comprise the compositions described above, particularly in terms of the respective metals or metal alloys and their concentrations used in the first and second layers. Also, the optional third and/or fourth layers preferably comprise the compositions described above, particularly in terms of the respective metals and their concentrations. Also preferably, the first, the second, the optional third and/or fourth layers have layer thicknesses according to the ranges described above for the respective layer. Also, the total thickness of the obtained coating is preferably in the ranges described above.

The method for applying the layers is not particularly limited. For example, at least one layer may be applied by a method selected from the group consisting of galvanic technique, vapor coating, sputtering, dip coating, spray coating, and any combinations of the above methods.

Good results in terms of corrosion protection and durability of the coating can be achieved, for example, if the first, the second and optional the fourth layers are applied by galvanic technique or electroplating, i.e., by the electrolytic deposition of a metal layer from an aqueous metal salt solution. The galvanic process may comprise further process steps, typically used in galvanic technique, such as degreasing, rinsing and/or the removal of surface oxides.

The third layer, if provided, is applied preferably by means of dip coating. Therefore, the base body may be fire-tinned, for example, by immersion in a bath of molten tin. As described above, the third layer may already be provided in that a commercially available base body made of fire-tinned copper sheet is used. Alternatively, the third layer may be omitted and the second layer may be applied directly to the copper sheet of the base body.

According to a further improvement of the method, a heat treatment may be carried out after application of the layers to the base body to assist in the formation of the intermetallic phase regions between the layers described above. Also, by heat treatment, as already described above, merging between the first and fourth layers to a modified first layer may be carried out. With such a merging of the first and fourth layers by means of heat treatment, in particular a tin- and zinc-containing alloy can be formed.

The heat treatment may be carried out in a temperature range of 50 to 350° C., preferably of 80 to 300° C., more preferably of 200 to 280° C., even more preferably of 220 to 270° C. and most preferably of 230 to 250° C. Thereby, the temperature after the heating process is preferably maintained for a time period of 1 second to 48 hours, more preferably of 3 seconds to 12 hours, even more preferably of 5 seconds to 5 minutes and most preferably of 5 seconds to 2 minutes. More preferably, the heat treatment is carried out at a temperature in the range of 200 to 280° C. which is held for a time period of 5 seconds to 5 minutes. Most preferably, the heat treatment is carried out at a temperature in the range of 220 to 270° C. which is held for a time period of 5 seconds to 2 minutes.

If the manufacturing of the electrical contact element according to any one of the methods described above requires a forming of the base body, the sequence of the forming steps and the steps for applying the coating is not particularly defined. For example, the method may comprise the steps that the base body is stamped from a copper band and bent over to a contact element, wherein at least one layer of the coating is applied between the stamping and the bending or following the bending. It is also possible to carry out the heat treatment after applying the layers before or after bending.

Also, an object of the present invention is an electrical contact element, which is obtainable by one of the methods described above.

BRIEF DESCRIPTION OF THE SEVERAL VIEWS OF THE DRAWING

The present invention will now be described, by way of example with reference to the accompanying drawings, in which:

FIG. 1 is a perspective view of an embodiment of an electrical contact element according to the invention prior to the connection of an electrical line, FIG. 2 is a perspective view of the contact element shown in FIG. 1 with a connected electrical line.

DETAILED DESCRIPTION OF THE INVENTION

Figure 3:
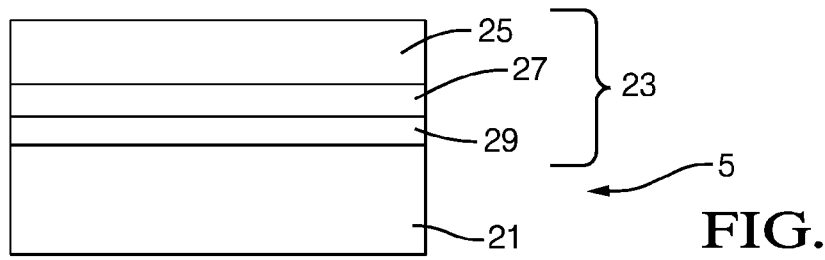
FIG. 3 shows schematically a connecting segment of an electrical contact element with a coating according to a first embodiment.

FIGS. 1 and 2 show an electrical contact element 1, comprising a contact portion 3 for contacting a complementary contact element, and a connecting segment 5 for connecting an electrical line 15. The connecting segment 5 in turn is divided into a crimping portion 7 having crimping wings 9 and a holding portion 11 having holding wings 13, which are provided for fixing the electrical line 15. For this purpose, the crimping wings 9 of the crimping portion 7 are crimped to stripped conductor material 17 of the electrical line 15, while the holding wings 13 of the holding portion 11 are crimped to the insulation 19 of the electrical line 15 (FIG. 2).

The connecting segment 5 is formed of a copper sheet 21 and provided with a coating 23.

According to a first embodiment shown schematically in FIG. 3, the coating 23 comprises a third layer 29 of tin applied by fire-tinning to a surface of the copper sheet 21. On the surface of the third layer 29 opposite the copper sheet 21, a galvanically applied second layer 27 is arranged made of bronze alloy containing copper, tin and zinc. Alternatively, the second layer 27 may also be formed of a brass alloy containing copper and zinc. In addition, on the surface of the second layer 27 opposite the copper sheet 21, a first layer 25 of tin is applied galvanically, which forms an outer layer, which is provided for the contacting of the conductor material 17 (FIG. 2).

Figure 4:
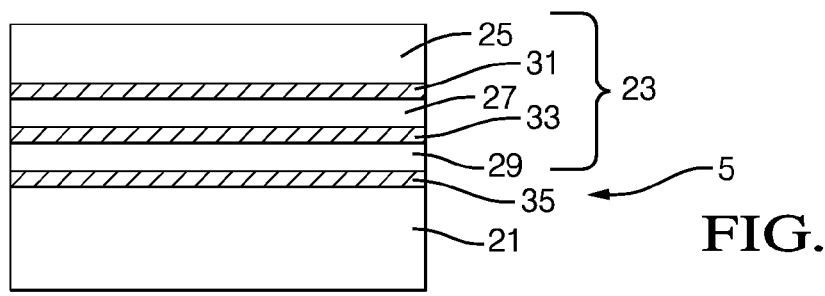
FIG. 4 shows schematically a connecting segment of an electrical contact element with a coating according to the first embodiment following heat treatment.

As shown in FIG. 4, between the layers 25, 27, and 29 there may be provided additional regions 31, 33 and 35 of intermetallic phases that form itself over time or can be specifically produced by heat treatment. In this case, a first intermetallic phase region 31 is disposed between the first layer 25 and second layer 27, a second intermetallic phase region 33 between the second layer 27 and third layer 29, and a third intermetallic phase region 35 between the third layer 29 and the copper sheet 21.

Figure 5:
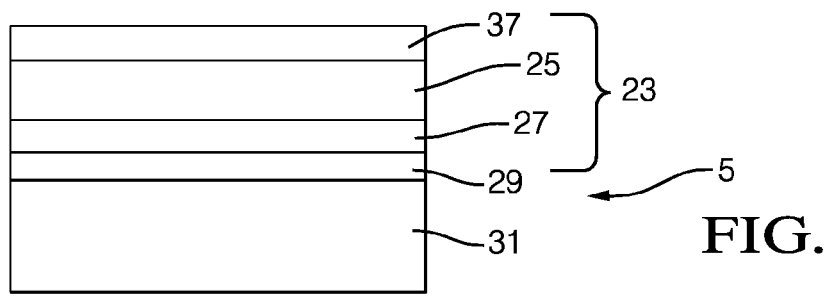
FIG. 5 shows schematically a connecting segment of an electrical contact element with a coating according to a second embodiment.

FIG. 5 shows a second embodiment of the coating 23 comprising four layers. First, a third layer 29 of tin, applied by fire-tinning, is disposed directly on the surface of the copper sheet 21, on which surface, opposite the copper sheet 21, immediately follows a galvanically applied second layer 27 of nickel. On the surface of the second layer 27 opposite the copper sheet 21 a galvanically applied first layer 25 is provided. Further, on the surface of the first layer 25 opposite the copper sheet 21 a galvanically applied fourth layer 37 of zinc is provided which forms an outer layer.

Figure 6:
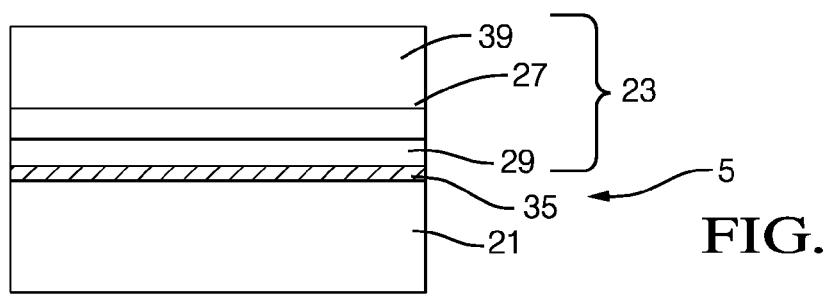
FIG. 6 shows schematically a connecting segment of an electrical contact element with a coating according to the second embodiment following heat treatment.

FIG. 6 shows the state of this second embodiment following heat treatment. Due to the heat treatment, the originally existing first layer 25 of tin and the fourth layer 37 of zinc have been merged into a modified first layer 39 containing both tin and zinc. Still, the second layer 27 of nickel and the third layer 29 of tin are present. Further, following heat treatment an intermetallic phase region 35 is present between the third layer 29 and the copper sheet 21.

Figure 7:
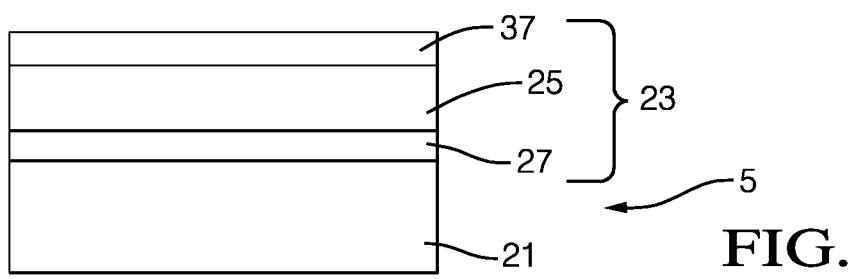
FIG. 7 shows schematically a connecting segment of an electrical contact element with a coating according to a third embodiment.

FIG. 7 shows a coating 23 according to a third embodiment, which has no third layer 29 of tin applied by fire-tinning. Rather, a galvanically applied second layer 27 of bronze alloy, containing copper, tin and zinc, is provided directly on the surface of the copper sheet 21. On the surface of the second layer 27 opposite the copper sheet 21 a galvanically applied first layer 25 of tin follows. Further, on the surface of the first layer 25 opposite the copper sheet 21, a galvanically applied fourth layer 37 of zinc is provided which forms an outer layer.

Figure 8:
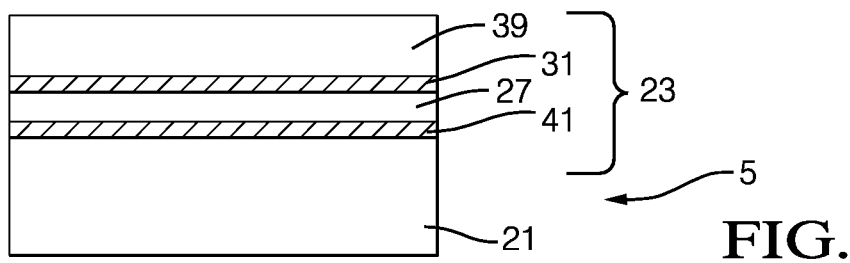
FIG. 8 shows schematically a connecting segment of an electrical contact element with a coating according to the third embodiment following heat treatment.

FIG. 8 shows the state of said third embodiment following heat treatment. Due to the heat treatment, the original first layer 25 and the original fourth layer 37 have been merged into a modified first layer 39 containing tin and zinc. Further provided are the second layer 27 of the bronze alloy, an intermetallic phase region 31 between the modified first layer 39 and the second layer 27 as well as another intermetallic phase region 41 between the second layer 27 and the copper sheet 21.

In the following, the manufacturing of the above embodiments of the contact element 1 will be described:

According to a first embodiment shown in FIG. 3, a copper band, comprising preforms with a fire-tinned third layer 29 stamped of copper sheet 21, which may be brought into the form of the electrical contact element 1 by bending, is initially subjected to a pretreatment prior to galvanizing. For this purpose, the portions of the preform, which form the connecting segment 5, are successively hot-degreased, rinsed, electrolytically degreased, rinsed, cleaned of surface oxides and rinsed again. A bronze alloy is then galvanically applied by electroplating as second layer 27 on the thus pretreated connecting segment 5 of the fire-tinned preform, wherein the electroplating is carried out for 4 minutes at 60° C. and a current density of 1 ampere/square decimeter (A/dm$^2$) in an aqueous bath having a copper ion concentration of 14 grams/liter (g/L), a tin ion concentration of 20 g/L and a zinc ion concentration of 4 g/L (e.g. using BRONZEX® WJ-SP available from Enthone, Inc. of West Haven, Conn.). In this way, a second layer 27 of bronze alloy is obtained having a composition of 50 to 55% by weight of copper, 28 to 32% by weight of tin and 15 to 19% by weight of zinc and having a thickness of 1 μm.

Alternatively, instead of the second layer 27 of the bronze alloy, a second layer 27 made of a brass alloy may be galvanically applied by electroplating onto the pretreated connecting segment 5 of the fire-tinned preform, wherein the electroplating is carried out for 8 minutes at 50° C. and a current density of 0.5 A/dm$^2$ in an aqueous bath, having a copper ion concentration of 18 g/L and a zinc ion concentration of 21 g/L (e.g. using TRIUMPF 10 available from Enthone, Inc). In this way, a second layer 27 of brass alloy is obtained having a thickness of 1 μm.

Subsequently, the portions of the preform comprising the second layer 27 are rinsed, cleaned of surface oxides and rinsed again, before a first layer 25 of tin is galvanically applied by electroplating onto the second layer 27. In practice, this tinning is carried out for 11 minutes at room temperature and at a current density of 1 A/dm$^2$ in an aqueous bath having a tin ion concentration of 80 g/L (e.g. using STANNOSTAR™ HMM 2 LF, a non-fluoroborate matte tin electrolyte available from Enthone, Inc.). The first layer 25 of tin thus obtained has a thickness of 5 μm.

After the tinning, the preform is rinsed again and dried for 3 minutes at 40° C. For completion of the electrical contact element 1, the preform is separated from the copper band by stamping and brought in its final shape by bending.

The contact element 1 thus obtained can now be connected with the electrical line 15 by crimping.

Optionally, the contact element 1 may be subjected to a heat treatment beforehand, in which the contact element 1 is heated within 2 minutes to 240° C. and held for 1 minute at this temperature before cooling to room temperature again. Due to the heat treatment, the intermetallic phase regions 31, 33 and 35 between the first layer 25 of tin and the second layer 27 of bronze or brass, between the second layer 27 and the fire-tinned third layer 29, and between the third layer 29 and the copper sheet 21 are specifically formed (FIG. 4).

According to a second embodiment shown in FIG. 5, a copper band, comprising preforms with a fire-tinned third layer 29 stamped of copper sheet 21, which may be brought into the form of the electrical contact element 1 by bending, is initially subjected to a pretreatment prior to galvanizing. For this purpose, those portions of the preform, which form the connecting segment 5, are successively hot-degreased, rinsed, electrolytically degreased, rinsed, cleaned of surface oxides and rinsed again. A nickel layer is then galvanically applied by electroplating as second layer 27 on the thus pretreated connecting segment 5 of the fire-tinned preform, wherein the electroplating is carried out for 7 minutes at 60° C. and a current density of 1 A/dm$^2$ in an aqueous bath having a nickel ion concentration of 113 g/L (e.g. using LECTRO-NIC™ 10-03 HSX available from Enthone, Inc.). In this way, a second layer 27 of nickel is obtained, having a thickness of 1 μm.

Subsequently, the portions of the preform comprising the second layer 27 are rinsed, cleaned of surface oxides and rinsed again, before a first layer 25 of tin is galvanically applied by electroplating onto the second layer 27. In practice, this tinning is carried out for 11 minutes at room temperature and at a current density of 1 A/dm$^2$ in an aqueous bath having a tin ion concentration of 80 g/L (e.g. using STANNOSTAR™ HMM 2 LF, a non-fluoroborate matte tin electrolyte available from Enthone, Inc.). The first layer 25 of tin thus obtained has a thickness of 5 μm.

After the tinning, the portions of the preform comprising the first layer 25 are rinsed, cleaned of surface oxides and rinsed again, before a fourth layer 37 of zinc is galvanically applied by electroplating onto the first layer 25. In practice, this zinc plating is carried out for 3 minutes at room temperature and at a current density of 1.5 A/dm$^2$ in an aqueous bath having a zinc ion concentration of 160 g/L (e.g. using ENTHOBRITE acidic zinc electrolyte available from Enthone, Inc.). The fourth layer 37 of zinc thus obtained has a thickness of 1 μm.

After the zinc plating, the preform is rinsed again and dried for 3 minutes at 40° C. For completion of the electrical contact element 1, the preform is separated from the copper band by stamping and brought in its final shape by bending.

Optionally, the contact element 1, before being connected with the electrical line 15 by crimping, may be subjected to heat treatment, in which the contact element 1 is heated within 2 minutes to 240° C. and held for 1 minute at this temperature before cooling to room temperature again. By the heat treatment, the original first layer 25 and the original fourth layer 37 are merged to the modified first layer 39 and the intermetallic phase region 35 between the fire-tinned third layer 29 and the copper sheet 21 is specifically formed (FIG. 6).

According to a third embodiment shown in FIG. 7, a copper band, comprising preforms without fire-tinning stamped of copper sheet 21, which may be brought into the form of the electrical contact element 1 by bending, is initially subjected to a pretreatment prior to galvanizing. For this purpose, those portions of the preform, which form the connecting segment 5, are successively hot-degreased, rinsed, electrolytically degreased, rinsed, cleaned of surface oxides and rinsed again. A bronze alloy is then galvanically applied by electroplating as second layer 27 on the thus pretreated copper sheet 21 of the connecting segment 5 of the preform, wherein the electroplating is carried out for 4 minutes at 60° C. and a current density of 1 A/dm$^2$ in an aqueous bath having a copper ion concentration of 14 g/L, a tin ion concentration of 20 g/L and a zinc ion concentration of 4 g/L (e.g. using BRONZEX® WJ-SP available from Enthone, Inc.). In this way, a second layer 27 of bronze alloy with a composition of 50 to 55% by weight of copper, 28 to 32% by weight of tin and 15 to 19% by weight of zinc is obtained, having a thickness of 1 μm.

Subsequently, the portions of the preform comprising the second layer 27 are rinsed, cleaned of surface oxides and rinsed again, before a first layer 25 of tin is galvanically applied by electroplating onto the second layer 27. In practice, this tinning is carried out for 11 minutes at room temperature and at a current density of 1 A/dm$^2$ in an aqueous bath having a tin ion concentration of 80 g/L (e.g. using STANNOSTAR™ HMM 2 LF, a non-fluoroborate matte tin electrolyte available from Enthone, Inc.). The first layer 25 of tin thus obtained has a thickness of 5 μm.

After the tinning, the portions of the preform comprising the first layer 25 are rinsed, cleaned of surface oxides and rinsed again, before a fourth layer 37 of zinc is galvanically applied by electroplating onto the first layer 25. In practice, this zinc plating is carried out for 3 minutes at room temperature and a current density of 1.5 A/dm$^2$ in an aqueous bath having a zinc ion concentration of 160 g/L (e.g. using ENTHOBRITE acidic zinc electrolyte available from Enthone, Inc.). The fourth layer 37 of zinc thus obtained has a thickness of 1 μm.

After the zinc plating, the preform is rinsed again and dried for 3 minutes at 40° C. For completion of the electrical contact element 1, the preform is separated from the copper band by stamping and brought in its final shape by bending.

Optionally, the contact element 1, before being connected with the electrical line 15 by crimping, may be subjected to heat treatment, in which the contact element 1 is heated within 2 minutes to 240° C. and held at this temperature for 1 minute before cooling to room temperature again. Due to the heat treatment, the original first layer 25 and the original fourth layer 37 are merged to the modified first layer 39 and the intermetallic phase regions 31 and 41 between the modified first layer 39 and the second layer 27 and between the second layer 27 and the copper sheet 21 are specifically formed (FIG. 8).

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

LIST OF REFERENCE NUMERALS

1 Contact element
3 Contact portion
5 Connecting segment
7 Crimping portion
9 Crimping wings
11 Holding portion
13 Holding wings
15 Electrical line
17 Conductor material
19 Insulation
21 Copper sheet
23 Coating
25 First layer
27 Second layer
29 Third layer
31 Intermetallic phase region
33 Intermetallic phase region
35 Intermetallic phase region
37 Fourth layer
39 Modified first layer
41 Intermetallic phase region

I claim:

1. An electrical contact element having a connecting segment which is formed of a copper sheet and comprises a coating, wherein the coating comprises:
    a first layer containing at least 60% by weight of tin; and
    a second layer disposed between the first layer and the copper sheet and containing a copper-containing alloy, wherein the copper-containing alloy contains 40 to 80% by weight of copper and 20 to 60% by weight of zinc, wherein the combined percentage by weight of copper and zinc is at least 90%.

2. The electrical contact element according to claim 1, wherein the second layer has a thickness of 0.5 to 5 µm.

3. The electrical contact element according to claim 1, wherein the second layer consists of the copper-containing alloy.

4. The electrical contact element according to claim 1, wherein the first layer has a thickness in a range of 1 to 15 µm.

5. The electrical contact element according to claim 1, wherein the first layer contains up to 40% by weight of zinc.

6. The electrical contact element according to claim 1, wherein the coating comprises a third layer disposed between the second layer and the copper sheet, wherein the third layer contains tin.

7. The electrical contact element according to claim 6, wherein the coating comprises a fourth layer disposed on a side of the first layer opposite the second layer wherein the fourth layer contains zinc.

8. A method for manufacturing an electrical contact element, comprising the steps of:
    providing a base body;
    applying a second layer on the base body, wherein the second layer contains a copper-containing alloy, wherein the copper-containing alloy contains 40 to 80% by weight of copper and 20 to 60% by weight of zinc, and wherein the combined percentage by weight of copper and zinc is at least 90%; and
    applying a first layer, containing at least 60% by weight of tin, on a side of the second layer opposite the base body.

9. The method according to claim 8, further comprising a step of heat treating the electrical contact element, wherein the heat treating step is performed after the step of applying the first layer.

10. The method according to claim 8, wherein the layers are each applied by a process selected from the group consisting of galvanic technique, vapor coating, sputtering, dip coating, spray coating, and any combinations of the above processes.

11. The method according to claim 8, wherein the base body is formed of a fire-tinned copper sheet.

12. The method according to claim 9, wherein the heat treating step is performed in a temperature range of 50 to 350° C. for a time period of 1 second to 48 hours.

13. The method according to claim 12, wherein the heat treating step is performed in a temperature range of 220 to 270° C. for a time period of 5 seconds to 2 minutes.

* * * * *